US012563013B1

(12) United States Patent
Wu et al.

(10) Patent No.: US 12,563,013 B1
(45) Date of Patent: Feb. 24, 2026

(54) LOCATING A SERVER IN A COMPUTER NETWORK

(71) Applicant: Trend Micro Incorporated, Yoyogi (JP)

(72) Inventors: Hungshen Wu, Taipei (TW); Jen Hao Hu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 262 days.

(21) Appl. No.: 18/480,256

(22) Filed: Oct. 3, 2023

(51) Int. Cl.
 H04L 61/5007 (2022.01)
 H04L 41/12 (2022.01)

(52) U.S. Cl.
 CPC .......... H04L 61/5007 (2022.05); H04L 41/12 (2013.01)

(58) Field of Classification Search
 CPC ............................ H04L 61/5007; H04L 41/12
 See application file for complete search history.

(56) References Cited

U.S. PATENT DOCUMENTS

| | | | |
|---|---|---|---|
| 8,935,759 B2 * | 1/2015 | Weizman ............ | H04L 61/4535 |
| | | | 726/28 |
| 2004/0008660 A1 * | 1/2004 | Lee ......................... | G01S 19/25 |
| | | | 370/349 |
| 2005/0066044 A1 * | 3/2005 | Chaskar .................. | H04L 67/04 |
| | | | 709/230 |
| 2011/0159862 A1 * | 6/2011 | Jackson ................ | H04W 4/029 |
| | | | 455/418 |
| 2019/0174256 A1 * | 6/2019 | Bertagna ............... | H04W 4/029 |

OTHER PUBLICATIONS

"Datagram", Wikipedia, Downloaded Aug. 28, 2023, https://en.wikipedia.org/wiki/Datagram.
"Secure Elements (Smart Cards)" ETSI, Smart Card Technology, Downloaded Aug. 28, 2023, https://www.etsi.org/technologies/smart-cards?jjj=1693257090064.
"SIM Card", Wikipedia, Downloaded Aug. 30, 2023, https://en.wikipedia.org/wiki/SIM_card.
"Smart Card", Wikipedia, Downloaded Aug. 28, 2023, https://en.wikipedia.org/wiki/Smart_card.
"User Datagram Protocol", Wikipedia, Downloaded Aug. 28, 2023, https://en.wikipedia.org/wiki/User_Datagram_Protocol.

* cited by examiner

*Primary Examiner* — Thomas J Dailey
(74) *Attorney, Agent, or Firm* — Beyer Law Group LLP

(57) ABSTRACT

A client locates a server in a computer network without using the Domain Name System (DNS). The client transmits a request User Datagram Protocol (UDP) packet that includes a locating pattern. Responsive to detecting the locating pattern in the request UDP packet, a monitor that monitors communication of the client informs the server of the Internet Protocol (IP) address and port number of the client. Responsive to receiving the IP address and port number of the client, the server sends the client a response UDP packet that includes the locating pattern and the IP address and port number of the server. The client uses the IP address and port number of the server from the response UDP packet to communicate with the server.

13 Claims, 2 Drawing Sheets

LOCATING A SERVER IN A COMPUTER NETWORK

TECHNICAL FIELD

The present disclosure is directed to computer networks.

BACKGROUND

A server in an Internet Protocol (IP) computer network has an IP address that a client needs to know to communicate with the server. The Domain Name System (DNS) allows the client to determine the IP address of the server by simply knowing the server's domain name. DNS translates the domain name to the IP address of the server, allowing the client to connect to the server even when the IP address of the server changes.

However, some computing environments have no DNS support. Examples of such computing environments include computing devices that run a smart card operating system, such as the JAVA Card operating system. In environments with no DNS support, the IP address of the server is hardcoded in the client, which is an issue if the IP address of the server changes or is not known beforehand.

BRIEF SUMMARY

In one embodiment, a method of locating a server in a computer network includes transmitting a first User Datagram Protocol (UDP) packet from a subscriber identity module (SIM) card over a wireless cellular network, the first UDP packet including a locating pattern that identifies the first UDP packet as a request for a location of the server, the locating pattern being indicated in a destination Internet Protocol (IP) address and a destination port number of the first UDP packet. Responsive to detecting the locating pattern in the first UDP packet at a monitoring device that monitors communication of the SIM card, the server is informed of an IP address and a port number of an applet running in the SIM card. Responsive to receiving the IP address and the port number of the applet in the server, a second UDP packet is sent to the applet, the locating pattern being indicated in a source IP address and a source port number of the second UDP packet, an IP address and a port number of the server being indicated in a payload of the second UDP packet. The second UDP packet is received by the applet in the SIM card. The applet communicates with the server using the IP address and the port number of the server indicated in the payload of the second UDP packet.

In another embodiment, a system comprises a client device, a monitoring device, and a server computer system. The client device comprises at least one processor and a memory, the memory of the client device storing instructions that when executed by the at least one processor of the client device cause the client device to transmit a first User Datagram Protocol (UDP) packet that includes a locating pattern and receive a second UDP packet from the server computer system, wherein the second UDP packet includes the locating pattern, an Internet Protocol (IP) address of a server running in the server computer system, and a port number of the server.

The monitoring device comprises at least one processor and a memory, the memory of the monitoring device storing instructions that when executed by the at least one processor of the monitoring device cause the monitoring device to detect the locating pattern in the first UDP packet, retrieve from the first UDP packet an IP address and a port number of a client running in the client device, and forward the IP address and port number of the client to the server computer system.

The server computer system comprises at least one processor and a memory, the memory of the server computer system storing instructions that when executed by the at least one processor of the server computer system cause the server computer system to receive the IP address and the port number of the client from the monitoring device and transmit the second UDP packet to the client device.

In yet another embodiment, a method of locating a server in a computer network includes transmitting, by a client, a first User Datagram Protocol (UDP) packet that includes a locating pattern that identifies the first UDP packet as a request for a location of a server. The locating pattern in the first UDP packet is detected at a monitor between the client and the server. In response to detecting the locating pattern in the first UDP packet, an Internet Protocol (IP) address and a port number of the client are provided to the server. A second UDP packet that is responsive to receiving the IP address and the port number of the client is transmitted by the server, the second UDP packet including the locating pattern, an IP address of the server, and a port number of the server. The second UDP packet is received in the client. The client communicates with the server using the IP address and the port number of the server indicated in the second UDP packet.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described in the context of SIM cards of 5G networks for illustration purposes only. As can be appreciated, embodiments of the present invention are equally applicable to other computer network use cases where DNS is not available.

Figure 1:
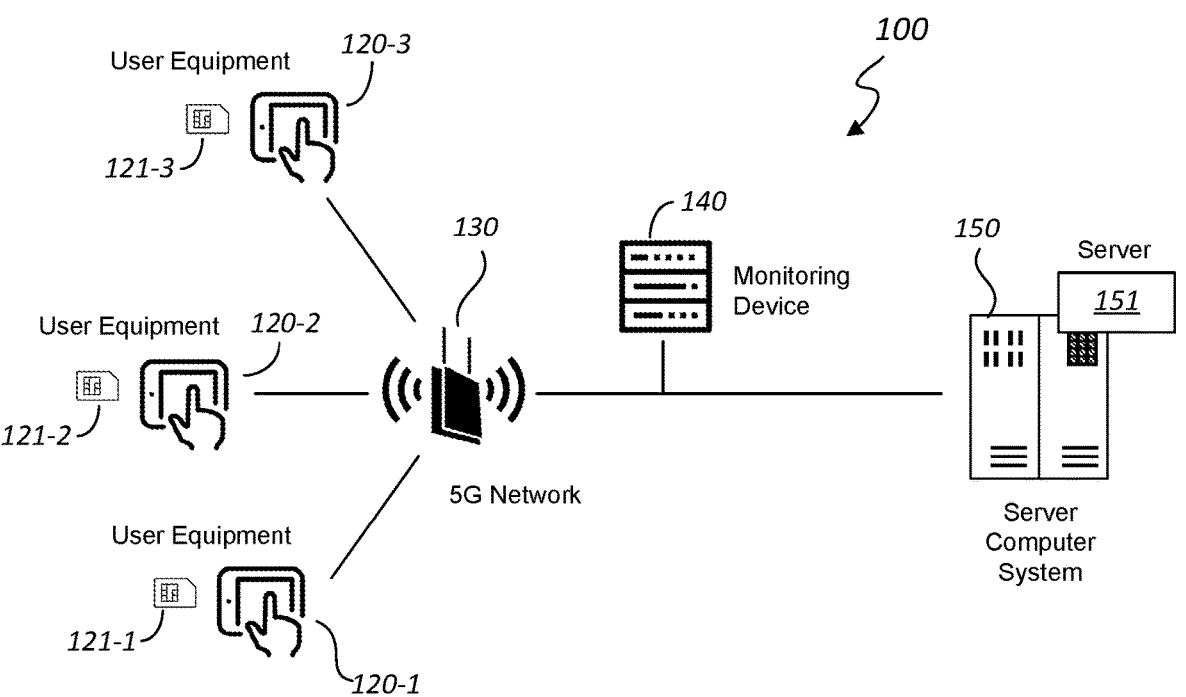
FIG. 1 shows a block diagram of a system for locating a server in a computer network, in accordance with an embodiment of the present invention.

FIG. 1 shows a block diagram of a system 100 for locating a server in a computer network, in accordance with an embodiment of the present invention. In the example of FIG. 1, the system 100 includes a plurality of user equipment (UE) 120 (i.e., 102-1, 120-2, 120-3, etc.), a wireless cellular network in the form of a 5G network 130, a monitoring device 140, and a server computer system 150. The plurality of user equipment 120, monitoring device 140, and the server computer system are in an IP computer network.

A user equipment 120 may be a smart phone, a 5G customer premise equipment (CPE), an Internet-of-things (IoT) device, or other computing device that accepts a smart card. As is well known, a smart card is a physical electronic authentication device that is used to control access to a resource. A smart card has at least one processor and a memory to execute a smart card operating system and an application program referred to as an "applet." In the example of FIG. 1, a user equipment 120 includes a smart card in the form of a Subscriber Identity Module (SIM) card 121 (i.e., 121-1, 121-2, 121-3, etc.). A SIM card 121 functions as a gatekeeper to the 5G network 130. More particularly, a SIM card 121 controls access of a corresponding user equipment 120 to the 5G network 130.

The monitoring device 140 is configured to receive all network communication from the plurality of user equipment 120. The monitoring device 140 may receive network communication between the plurality of user equipment 120 and the server computer system 150 by deploying the monitoring device 140 inline between the plurality of user equipment 120 and the server computer system 150, by mirroring gateway traffic to the monitoring device 140, or some other way. In one embodiment, the monitoring device 140 is deployed between a packet core of the 5G network and a router that routes network traffic to the public Internet. The monitoring device 140 may comprise at least one processor and a memory, with the memory of the monitoring device 140 storing instructions that when executed by a processor of the monitoring device 140 cause the monitoring device 140 to operate as described herein.

The server computer system 150 comprises at least one processor and a memory, with the memory storing instructions of a server 151 that are executed by a processor of the server computer system 150 to provide server functionality. The server computer system 150 may be a dedicated server computer system, a cloud computing platform (e.g., Amazon Web Services (AWS)™ service), or other computer system. The server computer system 150 has an IP address, which is associated with the server 151. More particularly, the IP address of the server 151 is the IP address of the server computer system 150, and the server 151 has a designated port number for network communications. In one embodiment, the server computer system 150 is accessible over the public Internet.

In one embodiment, the server 151 is configured to control a plurality SIM cards 121 to enable or disable access of corresponding user equipment 120 to the 5G network 130. The server 151 is configured to support cybersecurity operations in conjunction with a security applet 201 (see FIG. 2) running in a SIM card 121. For example, the server 151 may send a signal to the security applet 201 in a SIM card 121 of a compromised (e.g., infected by malicious code, under cyberattack, performing unauthorized operations etc.) user equipment 120 to disable access of the compromised user equipment 120 to the 5G network 130. Accordingly, the security applet 201 needs a way to locate the server 151 in the IP computer network to communicate with the server 151. Locating the server 151 is not straightforward because the security applet 201 runs in a computing environment that does not support DNS. The security applet 201 thus needs a way other than DNS to determine the IP address of the server 151 after the SIM card 121 is installed in the user equipment 120 and/or when the server 151 is moved to another server computer system.

Figure 2:
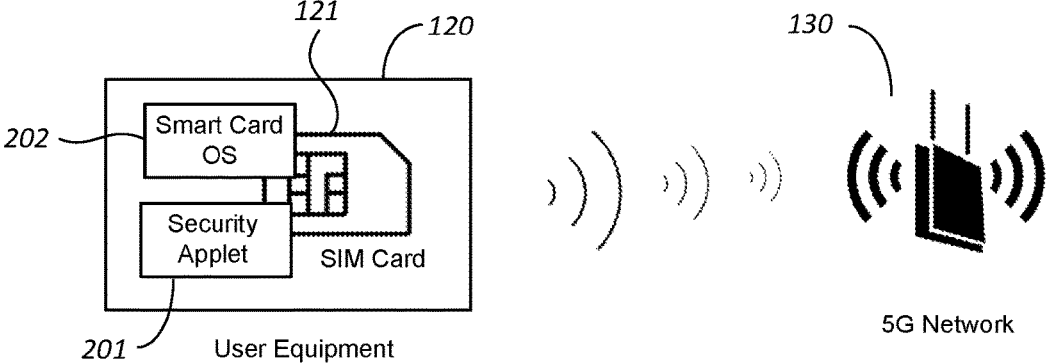
FIG. 2 shows a block diagram of a Subscriber Identity Module (SIM) card, in accordance with an embodiment of the present invention.

FIG. 2 shows a block diagram of a SIM card 121, in accordance with an embodiment of the present invention. In the example of FIG. 2, the SIM card 121 is installed in a user equipment 120 to allow the user equipment 120 to access the 5G network 130. The SIM card 121 comprises at least one processor and a memory (not shown), with the memory of the SIM card 121 storing instructions of a smart card operating system 202 and instructions of the security applet 201. In one embodiment, the smart card operating system 202 is the JAVA Card operating system. As previously noted, the security applet 201 cannot take advantage of DNS because the smart card operating system 202 does not support DNS.

It is to be noted that the SIM card 121 has its own processor and operating system, which operate separately from the processor and operating system of the user equipment 120. It is to be further noted that the smart card operating system 202 and the operating system of the user equipment 120 have separate protocol stacks. Typically, the user equipment 120 runs an operating system with DNS support, such as the LINUX operating system. However, the security applet 201 runs under the smart card operating system 202, which is separate from the operating system of the user equipment 120. That is, the security applet 201 cannot take advantage of the DNS functionality of the operating system of the user equipment 120.

As is conventional, the SIM card 121 and the user equipment 120 share the same IP address, with the security applet 201 having a designated port number for sending and receiving network traffic. That is, the security applet 121 uses the IP address of the user equipment 120, and is distinguished in the user equipment 120 by the port number of the security applet 121.

The security applet 201 is configured to work in conjunction with the server 151. In one embodiment, the security applet 201 is configured to receive signals from the server 151 in accordance with the Transmission Control Protocol (TCP). The SIM card 121 running the security applet 201 and the smart card operating system 202 operates as a client device with respect to the server computer system 150, in that the security applet 201 initiates establishment of a TCP connection to the server 151. Once the TCP connection is established, the server 151 may send signals to the security applet 201 over the TCP connection to control access of the user equipment 120 to the 5G network 130 as per a security policy or other cybersecurity-related purpose. In one embodiment, the security applet 201 is configured to disable access of the user equipment 120 to the 5G network 130 in response to a corresponding signal from the server 151, with the signal being sent over the TCP connection.

Figure 3:
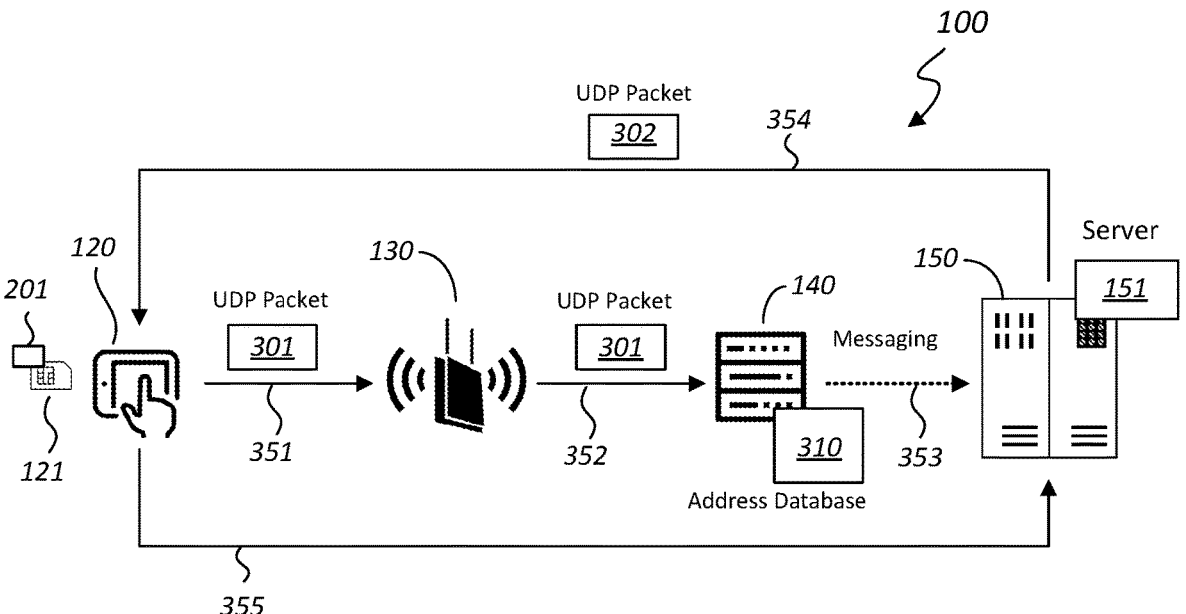
FIG. 3 shows a flow diagram of a method of locating a server in a computer network, in accordance with an embodiment of the present invention.

FIG. 3 shows a flow diagram of a method of locating a server in a computer network, in accordance with an embodiment of the present invention. The method of FIG. 3 is explained in the context of the system 100 for illustration purposes only. As can be appreciated, the method of FIG. 3 may be generally adapted to locate a server in an IP computer network where there is no DNS support.

In the example of FIG. 3, the security applet 201 wirelessly transmits, over the 5G network 130, a User Datagram Protocol (UDP) packet 301 that includes a locating pattern (see arrow 351). The locating pattern identifies the UDP packet 301 as a request for the location, in terms of IP address and port number, of the server 151 in the IP computer network. In one embodiment, the locating pattern is an arbitrary IP address/port number combination. The locating pattern may be used as the destination IP address and destination port number of the UDP packet 301. For example, assuming the locating pattern is "9.9.9.9:9999", the destination IP address of the UDP packet 301 is set to "9.9.9.9" and the destination port number of the UDP packet 301 is set to "9999".

In general, a UDP packet comprises a UDP datagram that is encapsulated in an IP packet. The destination IP address and source IP address of the UDP packet are indicated in the IP header of the IP packet, and the destination port number and source port number of the UDP packet are indicated in the header of the UDP datagram.

The monitoring device 140 is configured to monitor for UDP packets that include the locating pattern. In one embodiment, the monitoring device 140 looks for a UDP packet having a destination IP address and destination port number that match the locating pattern. In the example of FIG. 3, the monitoring device 140 receives the UDP packet 301 (see arrow 352) and identifies it as a request for the IP address and port number of the server 151 based on presence of the locating pattern. The monitoring device 140 obtains the IP address and port number of the security applet 201 from the source IP address and source port number of the UDP packet 301.

In response to receiving the UDP packet 301 that includes the locating pattern, the monitoring device 140 provides the server 151 (see arrow 353) the IP address and port number of the security applet 201. The monitoring device 140 locally maintains an address database 310 that contains the IP address and port number of the server 151. The monitoring device 140 consults the database 310 to obtain the IP address and port number of the server 151, which the monitoring device 140 uses to communicate with the server 151. The monitoring device 140 informs the server 151 (see arrow 353) of the IP address and port number of the security applet 201, such as by messaging or streaming (e.g., by Apache Kafka messaging system). As can be appreciated, other ways of forwarding the IP address and port number of the security applet 201 from the monitoring device 140 to the server 151 may also be employed without detracting from the merits of the present invention.

The server 151 receives the IP address and port number of the security applet 201 from the monitoring device 140. In response to receiving the IP address and port number of a client from the monitoring device 140, the server 151 is configured to send the client a response UDP packet that includes the locating pattern and the IP address and port number of the server 151. In one embodiment, the source IP address and source port number of the response UDP packet are set to the locating pattern, and the IP address and port number of the server 151 are included in the payload of the response UDP packet.

In the example of FIG. 3, the server 151 transmits a UDP packet 302 (see arrow 354) in response to receiving the IP address and port number of the security applet 201 from the monitoring device 140. The destination IP address and destination port number of the UDP packet 302 are those of the security applet 201 as per the corresponding message from the monitoring device 140. The source IP address and source port number of the UDP packet 302 are set to the locating pattern, allowing the security applet 201 to authenticate the UDP packet 302 as being from the server 151. More particularly, assuming the locating pattern is "9.9.9.9:

9999", the source IP address of the UDP packet 302 is set to "9.9.9.9" and the source port number of the UDP packet 301 is set to "9999". The payload of the UDP packet 302 contains the IP address and port number of the server 151. The IP address and port number of the server 151 do not match the locating pattern in this example.

Responsive to receiving the UDP packet 302 from a server having an IP address and port number that match the locating pattern, the security applet 201 communicates with that server using the IP address and port number indicated in the payload of the UDP packet 302 (see arrow 355). For example, the security applet 201 may initiate establishment of a TCP connection between the security applet 201 and the server 151 and thereafter communicate with the server 151 over the TCP connection. As can be appreciated, the security applet 201 may communicate with the server 151 using a protocol other than TCP, e.g., using UDP.

The method of FIG. 3 is described in the context of a single SIM card 121 running a security applet 201. As can be appreciated, the method of FIG. 3 applies to a plurality of security applets 201 that run in different SIM cards 121. In that case, all of the security applets 201 use the same locating pattern to locate the server 151. The monitoring device 140 and the server 151 can distinguish individual security applets 201 by their IP address and port number. Because the locating pattern is not necessarily the IP address and port number of the server 151, the security applets 201 do not necessarily have to know the IP address and port number of the server 151. Accordingly, the IP address and port number of the server 151 may be changed without affecting the ability of the security applets 201 to locate the server 151. Advantageously, the SIM cards 121 with the security applets 201 may be deployed without having to know the IP address and port number of the server 151 beforehand.

Figure 4:
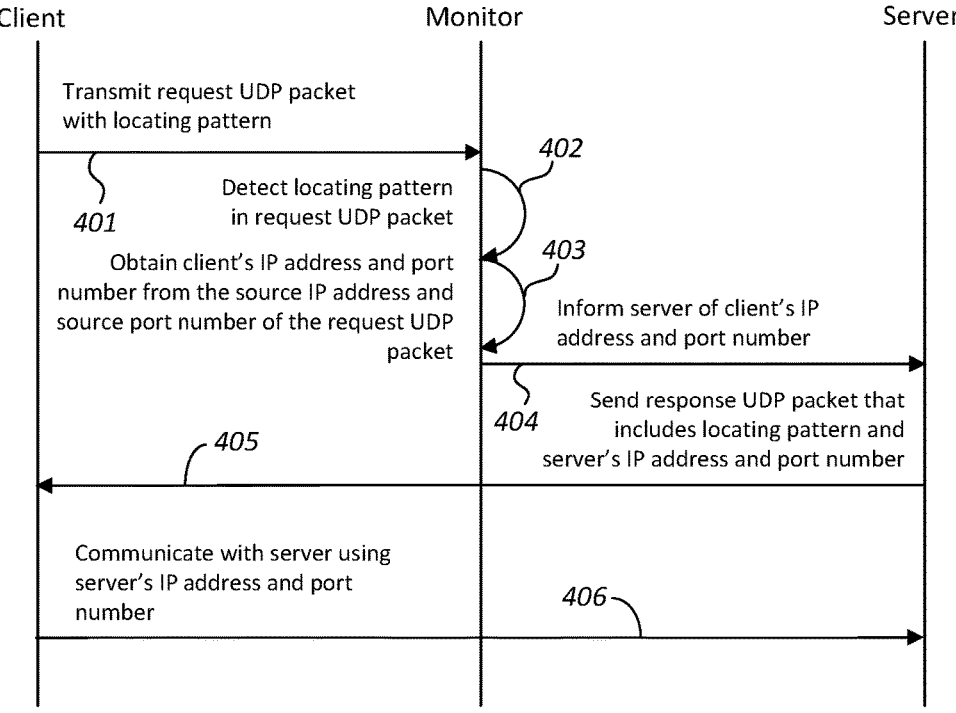
FIG. 4 shows a call diagram of a method of locating a server in a computer network, in accordance with an embodiment of the present invention.

FIG. 4 shows a call diagram of a method of locating a server in a computer network, in accordance with an embodiment of the present invention. In the example of FIG. 4, a client is trying to locate a server in an IP computer network, with the client running in a computing environment that has no DNS support. In one embodiment, the client is an applet running under a smart card operating system in a smart card. The server is server software that is hosted by a server computer system. The monitor is monitoring software hosted by a monitoring device that monitors communication between the client and the server.

In the example of FIG. 4, the client transmits a request UDP packet that has a locating pattern over an IP computer network (see arrow 401). In one embodiment, the locating pattern is a predetermined IP address and port number that are not necessarily those of the server. The destination IP address and destination port number of the request UDP packet are set to the locating pattern. That is, the destination IP address of the request UDP packet is set to be an IP address of the locating pattern, and the destination port number of the request UDP packet is set to be a port number of the locating pattern.

The monitor receives the request UDP packet transmitted by the client, and detects the locating pattern in the request UDP packet (see arrow 402). More particularly, the monitor identifies the destination IP address and destination port number of the request UDP packet as matching the locating pattern, indicating that the request UDP packet is a request for the location of the server. Responsive to detecting the locating pattern from the request UDP packet, the monitor retrieves the client's IP address and port number from the source IP address and source port number of the request UDP packet (see arrow 403). Responsive to detecting the locating pattern in the request UDP packet, the monitor informs the server of the IP address and port number of the client (see arrow 404).

Responsive to receiving the IP address and port number of the client from the monitor, the server sends the client a response UDP packet (see arrow 405). The response UDP packet includes the locating pattern and the IP address and port number of the server. The destination IP address and destination port number of the response UDP packet are those of the client as reported by the monitor. The source IP address and source port number of the response UDP packet are set to the locating pattern. That is, the source IP address of the response UDP packet is set to the IP address of the locating pattern, and the source port number of the response UDP packet is set to the port number of the locating pattern. The payload of the response UDP packet contains the IP address and the port number of the server.

The client receives the response UDP packet, and obtains the IP address and port number of the server from the payload of the response UDP packet. The client uses the IP address and port number of the server to communicate with the server (see arrow 406). For example, using the IP address and port number of the server, the client may establish a TCP connection with server, and thereafter communicate with the server over the TCP connection.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of locating a server in a computer network, the method comprising:

transmitting a first User Datagram Protocol (UDP) packet from a subscriber identity module (SIM) card over a wireless cellular network, the first UDP packet including a locating pattern that identifies the first UDP packet as a request for a location of a server, the locating pattern being indicated in a destination Internet Protocol (IP) address and a destination port number of the first UDP packet;

informing the server of an IP address and a port number of an applet that is running in the SIM card in response to detecting the location pattern in the first UDP packet at a monitoring device that monitors communication of the SIM card;

in response to receiving the IP address and the port number of the applet in the server, sending a second UDP packet to the applet, the locating pattern being indicated in a source IP address and a source port number of the second UDP packet, an IP address and a port number of the server being indicated in a payload of the second UDP packet; and the applet using the IP address and the port number of the server indicated in the payload of the UDP packet to communicate with the server.

2. The method of claim 1, wherein the SIM card is installed in a smart phone or customer premise equipment.

3. The method of claim 1, wherein the wireless cellular network is a 5G network.

4. The method of claim 1, further comprising:

transmitting a signal from the server to the applet, the signal instructing the applet to terminate access to the wireless cellular network of a smartphone or customer equipment in which the SIM card is installed.

5. The method of claim 1, wherein the applet communicates with the server by:

establishing a Transmission Control Protocol connection between the applet and the server.

6. A system comprising:

a client device comprising at least one processor and a memory, the memory of the client device storing instructions that when executed by the at least one processor of the client device cause the client device to transmit a first User Datagram Protocol (UDP) packet that includes a locating pattern and to receive a second UDP packet transmitted from a server computer system, wherein the second UDP packet includes the locating pattern, an Internet Protocol (IP) address of a server running in the server computer system, and a port number of the server;

a monitoring device comprising at least one processor and a memory, the memory of the monitoring device storing instructions that when executed by the at least one processor of the monitoring device cause the monitoring device to detect the locating pattern in the first UDP packet, retrieve from the first UDP packet an IP address and a port number of a client running in the client device, and forward the IP address and port number of the client to the server computer system; and the server computer system comprising at least one processor and a memory, the memory of the server computer system storing instructions that when executed by the at least one processor of the server computer system cause the server computer system to receive the IP address and the port number of the client from the monitoring device and transmit the second UDP packet to the client device, wherein the locating pattern is indicated in a destination IP address and a destination port number of the first UDP packet, and wherein the locating pattern is indicated in a source IP address and a source port number of the second UDP packet.

7. The system of claim 6, wherein the IP address and the port number of the server is indicated in a payload of the second UDP packet.

8. The system of claim 6, wherein the client device is a smart card.

9. The system of claim 8, wherein the smart card is a subscriber identity module (SIM) card that is installed in a smartphone or a customer premise equipment (CPE).

10. The system of claim 9, wherein the client device transmits the first UDP packet over a 5G network.

11. A method of locating a server in a computer network, the method comprising:

transmitting, by a client, a first User Datagram Protocol (UDP) packet that includes a locating pattern that identifies the first UDP packet as a request for a location of a server;

detecting, at a monitor, the locating pattern in the first UDP packet;

in response to detecting the locating pattern in the first UDP packet at the monitor, providing an Internet Protocol (IP) address and a port number of the client to the server;

transmitting, by the server, a second UDP packet that is responsive to receiving the IP address and the port number of the client, the second UDP packet including the locating pattern, an IP address of the server, and a port number of the server;

receiving the second UDP packet in the client; and the client communicating with the server using the IP address and the port number of the server indicated in the second UDP packet, wherein the locating pattern is indicated in a destination IP address and a destination port number of the first UDP packet, and wherein the locating pattern is indicated in a source IP address and a source port number of the second UDP packet.

12. The method of claim 11, wherein the client uses the IP address and the port number of the server indicated in the second UDP packet to initiate establishment of a Transmission Control Protocol (TCP) connection between the client and the server.

13. The method of claim 11, wherein the IP address and the port number of the server are indicated in a payload of the second UDP packet.

\* \* \* \* \*